US012699525B1

(12) United States Patent
Arumugam et al.

(10) Patent No.: US 12,699,525 B1
(45) Date of Patent: Aug. 4, 2026

(54) SYSTEM AND METHOD FOR UPDATING PROFILES STORED IN A MEMORY

(71) Applicant: Bank of America Corporation, Charlotte, NC (US)

(72) Inventors: Ramesh Arumugam, Lake Wylie, SC (US); Nathan L Macaluso, Denver, CO (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/085,820

(22) Filed: Mar. 20, 2025

(51) Int. Cl.
*G06F 3/00* (2006.01)
*G06F 3/06* (2006.01)

(52) U.S. Cl.
CPC .......... *G06F 3/0652* (2013.01); *G06F 3/0604* (2013.01); *G06F 3/0673* (2013.01)

(58) Field of Classification Search
CPC ..... G06F 3/0652; G06F 3/0604; G06F 3/0673
See application file for complete search history.

(56) References Cited

U.S. PATENT DOCUMENTS

| | | | |
|---|---|---|---|
| 6,735,662 B1 | 5/2004 | Connor | |
| 7,103,637 B2 | 9/2006 | Depelteau | |
| 7,222,150 B1 | 5/2007 | Phillips et al. | |
| 7,260,576 B2 | 8/2007 | Pasupathy et al. | |
| 7,289,509 B2 | 10/2007 | Brown et al. | |
| 8,090,790 B2 | 1/2012 | Bestler | |
| 8,539,112 B2 | 9/2013 | Craft et al. | |
| 8,831,030 B2 | 9/2014 | Ongole et al. | |
| 9,894,139 B2 | 2/2018 | Carbone et al. | |
| 11,592,986 B2 | 2/2023 | Dronamraju et al. | |
| 11,630,807 B2 | 4/2023 | George et al. | |
| 11,720,525 B2 | 8/2023 | Pandit et al. | |
| 11,797,477 B2 | 10/2023 | George et al. | |
| 11,868,312 B2 | 1/2024 | George et al. | |
| 11,914,884 B2 | 2/2024 | Pandit et al. | |
| 12,019,524 B2 | 6/2024 | Yelheri et al. | |
| 12,081,543 B2 * | 9/2024 | Gupta | H04L 63/0861 |
| 12,210,757 B2 | 1/2025 | George et al. | |
| 2003/0004948 A1 | 1/2003 | Bohrer et al. | |
| 2014/0068220 A1 | 3/2014 | Osborn et al. | |
| 2014/0310277 A1 * | 10/2014 | Ricci | G06F 16/951 707/736 |
| 2016/0308812 A1 * | 10/2016 | Johnstone | H04L 67/1097 |
| 2020/0285611 A1 | 9/2020 | George et al. | |
| 2021/0392132 A1 * | 12/2021 | Olden | H04L 67/1095 |

* cited by examiner

*Primary Examiner* — Craig S Goldschmidt

(57) ABSTRACT

In response to receiving a request to perform a first data interaction using a default data profile of a user including transport of a first amount of data objects to a target data profile, the requested data objects are electronically transported from the default data profile to the target data profile and a first interaction record of the first data interaction is stored in the default data profile. Thereafter, based on a preconfigured rule, the first data interaction is electronically transported from the default data profile to a first data profile of the user including electronically deleting the first interaction record from the default data profile and storing a second interaction record of the first data interaction as part of the first data profile of the user.

20 Claims, 2 Drawing Sheets

SYSTEM AND METHOD FOR UPDATING PROFILES STORED IN A MEMORY

TECHNICAL FIELD

The present disclosure relates generally to network communication, and more specifically to a system and method for updating profiles stored in a memory.

BACKGROUND

Computer systems may be used to transport data between data files. There is a need for improved tools and methods for automatically transporting data between data files.

SUMMARY

Embodiments of the present disclosure provide technical solutions to the technical problems noted above by providing techniques for electronically transporting digital interaction records associated with digital data interactions between data profiles of a user based on a rule configuration specified by the user.

In one or more embodiments of the present disclosure, a system comprises a memory that stores a set of rules for transporting data interactions between data profiles of a user and a processor communicatively coupled to the memory. The system further comprises a processor that is configured to receive a first request to perform a first data interaction using a default data profile of the user, wherein the first request includes a request to transport a first amount of data objects to a target data profile. In response to receiving the first request, the processor accesses, from the memory, the first amount of the data objects associated with the default data profile of the user. The processor electronically transports the first amount of the data objects from the default data profile of the user to the target data profile, wherein the electronic transport comprises a first electronic transport. The processor then stores a first record of the first data interaction as part of the default data profile of the user.

After the first electronic transport is completed, the processor accesses the set of rules from the memory, wherein the set of rules comprises a translation between each type of a plurality of types of data interactions to a particular data profile of the user. The processor identifies a first type of the first data interaction based on a first information tag associated with the first request and executes a query in the memory based on the first type of the first data interaction to search the set of rules for a first rule that translates the first type of data interaction to a first data profile of the user. The processor obtains the first data profile of the user as a result of executing the query and electronically deletes the first record of the first data interaction from the default data profile of the user. The processor then electronically stores a second record of the first data interaction as part of the first data profile of the user, wherein the second record indicates the first amount of the data objects transported from the first data profile of the user to the target data profile.

The present disclosure solves technical problems rooted in computer technology and provides a practical application of updating data profiles to enhance data accuracy and consistency, which leads to system stability and reduces system downtime. The present disclosure updates data profiles in real-time, or near real-time, to reflect the most current information and thereby reduces or eliminates data discrepancies that can affect downstream computer elements that rely on the data profiles for subsequent processing. In conventional systems, these downstream computer elements may try to process data from profiles that are not updated, leading to hung states and possible system downtime. Using the teachings of the present disclosure, computer systems using updated and accurate data profiles are less likely to suffer the drawbacks of hung states and system downtime. Additionally, real-time, or near real-time, updates can involve data replication across multiple servers or data centers. This redundancy ensures that if one server goes down, another can take over without data loss or significant downtime.

The automated updates provided by the present disclosure can include consistency checks that ensure data integrity across the system. This reduces the likelihood of corrupted data, which can cause system failures. Additionally, the disclosed systems can detect and correct errors in real-time, preventing small issues from escalating into major system outages. Regular, automated backups of updated data profiles ensure that the latest data is always available for recovery. This minimizes data loss and speeds up the recovery process in the event of an outage. With up-to-date backups, systems can be restored quickly to their most recent state, reducing downtime and ensuring business continuity. Furthermore, the systems described herein continuously monitor data profiles and system performance. This allows for the early detection of potential issues before they lead to outages. Automated updates include robust access controls that prevent unauthorized changes to data profiles, reducing the risk of security breaches that can cause system outages. The system of the present disclosure also provides detailed logs of all changes made to data profiles, enhancing traceability and accountability, leading to improved data integrity and security. For example, detailed logs of all changes to data profiles provide a clear audit trail, making it easier to identify and address the root cause of any issues that arise.

Additionally, by updating the data profiles as described herein, the computer systems can enforce data standards and formats, leading to more uniform and high-quality data. And, the updated data profiles can include validation checks and cleaning routines to remove duplicates, correct errors, and fill in missing information. The computer systems described herein provide distinct advantages over any human operation because they can handle large volumes of data more efficiently than any manual processes, making it possible to scale operations.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
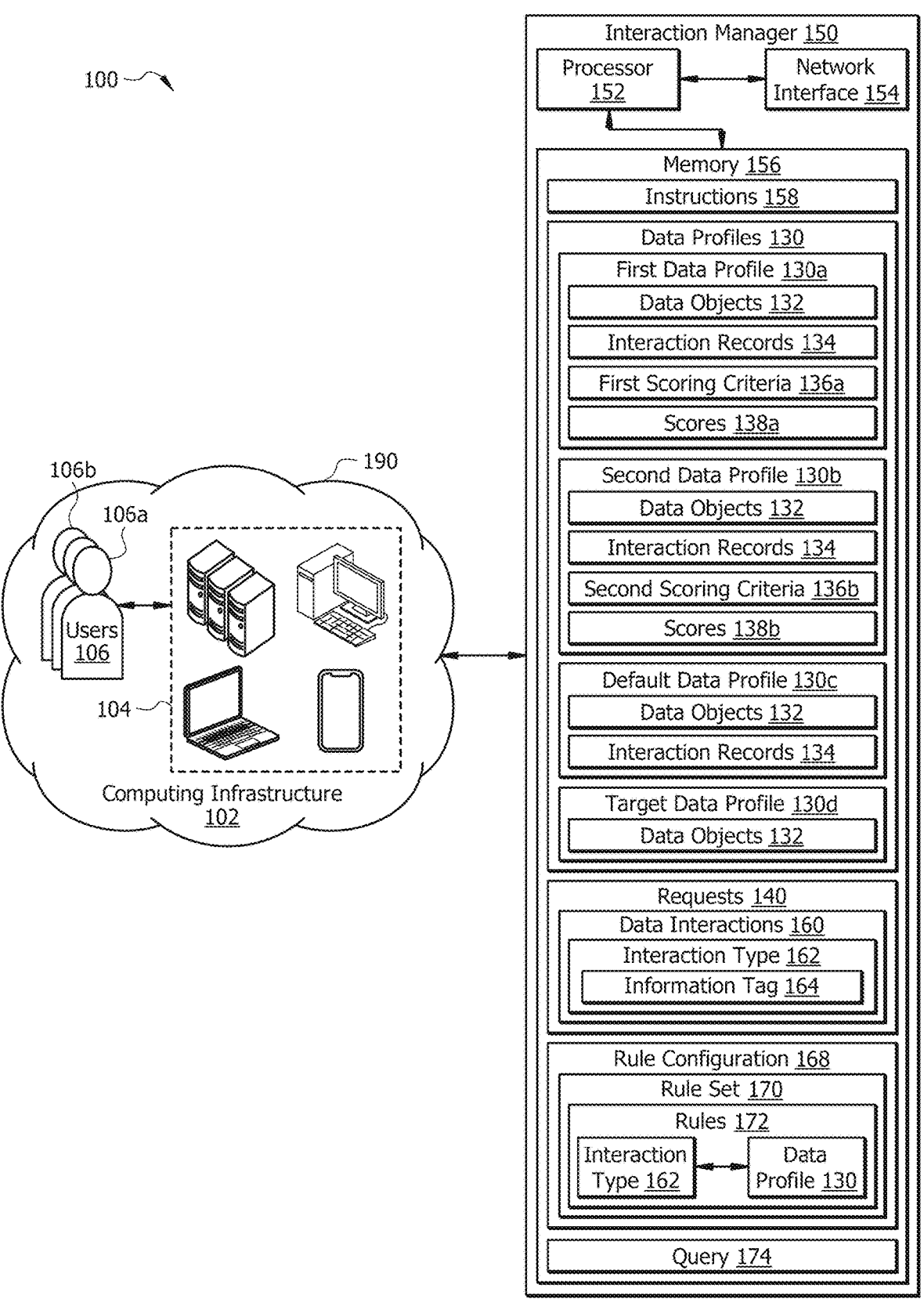
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 connected to a network 190. Computing infrastructure 102 may include a plurality of hardware and software components. The hardware components may include, but are not limited to, computing nodes 104 such as desktop computers, smartphones, tablet computers, laptop computers, data servers and data centers, mainframe computers, virtual reality (VR) headsets, augmented reality (AR) glasses and other hardware devices such as printers, routers, hubs, switches, and memory all connected to the network 190. Software components may include software applications that are run by one or more of the computing nodes 104 including, but not limited to, operating systems, user interface applications, third party software, database management software, service management software, mainframe software, metaverse software, AI tools and other customized software programs (e.g., interaction manager 150) implementing particular functionalities. For example, software code relating to one or more software applications may be stored in a memory device and one or more processors (e.g., belonging to one or more computing nodes 104) may execute the software code to implement respective functionalities. An example software application run by one or more computing nodes 104 of the computing infrastructure 102 may include the interaction manager 150. In one embodiment, at least a portion of the computing infrastructure 102 may be representative of an Information Technology (IT) infrastructure of an organization.

One or more of the computing nodes 104 may be operated by a user 106. In this context, a computing node 104 operated by a user may be referred to as a user device. For example, a computing node 104 may provide a user interface using which a user 106 may operate the computing node 104 to perform data interactions within the computing infrastructure 102. The term "computing node 104" may be replaced by "user device" in this disclosure when the computing node 104 is operated by a user 106.

One or more computing nodes 104 of the computing infrastructure 102 may be representative of a computing system which hosts software applications that may be installed and run locally or may be used to access software applications running on a server. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality as described below. In certain embodiments, one or more of the computing nodes 104 may run a thin client software application where the processing is directed by the thin client but largely performed by a central entity such as a server (not shown).

Network 190, in general, may be a wide area network (WAN), a personal area network (PAN), a cellular network, or any other technology that allows devices to communicate electronically with other devices. In one or more embodiments, network 190 may be the Internet.

Embodiments provide techniques for electronically transporting digital interaction records 134 associated with digital data interactions 160 between data profiles 130 of a user 106 based on a rule configuration 168 specified by the user 106.

At least a portion of the computing infrastructure 102 (e.g., one or more computing nodes 104) may implement an interaction manager 150 which may be configured to implement techniques for electronically transporting digital interactions records 134 associated with digital data interactions 160 between data profiles 130 of a user 106. The interaction manager 150 includes a processor 152, a memory 156, and a network interface 154. The interaction manager 150 may be configured as shown in FIG. 1 or in any other suitable configuration.

The processor 152 includes one or more processors operably coupled to the memory 156. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions 158 to implement the interaction manager 150. In this way, processor 152 may be a special-purpose computer designed to implement the functions disclosed herein. In one or more embodiments, the interaction manager 150 is implemented using logic units, FPGAs, ASICs, DSPs, or any other suitable hardware. The interaction manager 150 is configured to operate as described with reference to FIGS. 1 and 2. For example, the processor 152 may be configured to perform at least a portion of method 200 as described with reference to FIG. 2 respectively.

The memory 156 includes a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may include a read-only memory (ROM), random-access memory (RAM), ternary content-addressable memory (TCAM), dynamic random-access memory (DRAM), and static random-access memory (SRAM).

The memory 156 is operable to store the instructions 158, data profiles 130 and associated data stored in each of the data profiles such as data objects 132, digital interaction records 134, respective scoring criteria (e.g., first scoring criteria 136*a* and second scoring criteria 136*b*, and scores 138, requests 140, information relating to digital data interactions 160, rule configurations 168, rules sets 170, queries 174, and any other data needed to performed operations of the interaction manager 150 as described in embodiments of the present disclosure. The instructions 158 may include any suitable set of instructions, logic, rules, or code operable to execute the interaction manager 150.

The network interface 154 is configured to enable wired and/or wireless communications. The network interface 154 is configured to communicate data between the interaction manager 150 and other devices, systems, or domains (e.g., computing nodes 104). For example, the network interface 154 may include a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that each of the computing nodes 104 may be implemented like the interaction manager 150 shown in FIG. 1. For example, each of the computing nodes 104 may have a respective processor and a memory that stores data and instructions to perform a respective functionality of the computing node 104.

In one or more embodiments, interaction manager 150 may be configured to electronically transport (e.g., move) a digital data interaction 160 between data profiles 130 associated with a user 106. As described in more detail below, transporting (e.g., moving) a digital data interaction 160 between two data profiles 130 of a user 106 includes electronically transporting a digital interaction record 134 of the digital data interaction 160 between the two data profiles 130. In this context, interaction manager 150 may have access to a plurality of data profiles 130, wherein each data profile 130 is associated with (e.g., owned and/or managed by) a respective user 106 or entity. The data profiles 130 may be stored anywhere (e.g., any computing node 104) in the computing infrastructure 102 such as at a database (not shown) or in memory 156 of interaction manager 150. For example, as shown in FIG. 1, memory 156 stores first data profile 130a, second data profile 130b, default data profile 130c, and target data profile 130d. While FIG. 1 illustrates the data profiles 130 stored in memory 156 of the interaction manager 150, it may be noted that one or more of these data profiles 130 may be stored at any one or more computing nodes 104 of the computing infrastructure 102 and accessible by the interaction manager 150. In one example embodiment, first data profile 130a, second data profile 130b, and default data profile 130c are owned and/or managed by a first user 106a. Target data profile 130d may be owned and/or managed by another user (e.g., second user 106b) or entity.

A user 106 may perform several digital data interactions 160 using one or more data profiles 130 owned and/or managed by the user 106. An example digital data interaction 160 that may be performed by the first user 106a may include electronically transporting a pre-selected amount/ number of data objects 132 from any one of the data profiles 130 (e.g., first data profile 130a, second data profile 130b or default data profile 130c) associated with the first user 106a to a target data profile 130d owned and/or managed by a second user 106b or entity. The term "digital data interaction" may refer to an interaction that can be completed entirely electronically without the need for physical paper or digital assets. Each digital data interaction 160 performed by a user 106 (e.g., first user 106a) may be associated with a particular interaction type 162 of a plurality of interaction types 162 that may be associated with digital data interactions 160. An interaction type 162 may represent a type/ category of service or product received by the user 106 (e.g., first user 106a) in exchange of a pre-selected amount/ number of data objects 132 electronically transported from a data profile 130 of the user 106 to a target data profile 130d of another user 106 or entity providing the respective service or product.

A data profile 130 may store several pieces for data/ information, wherein the particular pieces of data/informa- tion stored in a particular data profile 130 depends on a type of the data profile 130, ownership of the data profile 130, a function/use of the data profile 130 or a combination thereof. For example, as shown in FIG. 1, each of the first data profile 130a and second data profile 130b owned and/or managed by first user 106a may store data objects owned by the first user 106a, digital interaction records 134 of digital data interactions 160 performed using the respective data profile 130a/b, a respective scoring criteria 136a/b associated with each respective data profile 130a/b defining how respective scores 138a/b are to be determined for each digital data interaction 160, and the respective scores 138a/b assigned for each digital data interaction 160 performed using the respective data profile 130a/b. In the context of the present disclosure, data objects 132 may represent digital assets owned by a user (e.g., first user 106) or an entity, wherein each digital object is associated with a pre-selected value.

As shown in FIG. 1, default data profile 130 associated with the first user 106a may store at least a portion of data objects 132 owned by the first user 106a and digital inter- action records 134 of digital data interactions performed using the default data profile 130c. The target data profile 130d may at least store data objects 132 electronically transported by users 106 (e.g., first user 106a) to the target data profile 130d.

In one or more embodiments, interaction manager 150 may be configured to assign a score 138 to a particular digital data interaction 160 performed using a particular data profile 130 based on scoring criteria 136 associated with the particular data profile 130. Scoring criteria 136 associated with a particular data profile 130 may include a plurality of scoring criteria 136, wherein each scoring criterion 136 defines a criterion for assigning a score 138 to digital data interactions 160 of a particular interaction type 162. For example, scoring criteria 136 associated with a particular data profile 130 may include a different scoring criterion 136 for different interaction types 162. This means that interac- tion manger 150 determines and assigns a score 138 to a particular digital data interaction 160 performed using a particular data profile 130 based on a scoring criterion 136 defined for the interaction type 162 of the particular digital data interaction 160 as defined for the particular data profile 130. In one embodiment, scoring criteria 136 associated with different data profiles 130 may define different criterion for assigning scores 138 to digital data interactions 160 of the same type.

As shown in FIG. 1, the first data profile 130a stores first scoring criteria 136a and second data profile 130b stores second scoring criteria 136b. In one example, the first scoring criteria 136a defines that a score 138a is assigned to a digital data interaction 160 of a particular interaction type 162 performed using the first data profile 130a as a first percentage of an amount of data objects 132 transported from the first data profile 130a as part of the digital data interaction 160. On the other hand, the second scoring criteria 136b defines that a score 138b is assigned to a digital data interaction 160 of the same particular interaction type 162 performed using the second data profile 130b as a second percentage of an amount of data objects 132 trans- ported from the second data profile 130b as part of the digital data interaction 160. This means that depending on the values of the first and second percentages, one of the first and second scoring criteria may assign a higher score for the same digital data interaction 160 of the same interaction type 162 when performed using the respective data profile 130.

In one embodiment, scores 138 stored in a data profile 130 may be transformed to data objects 132 based on a pre-configured transformation criterion. For example, example, a transformation criterion may specify that each score of 100 may be transformed to one data object. This means that a score of 500 may be transformed to 5 data objects and a score of 1000 may be transformed to 10 data objects, and so on.

Each digital interaction record 134 stored in a particular data profile 130 includes information associated with a particular digital data interaction 160 performed using the particular data profile 130, wherein the digital interaction record of the particular digital data interaction 160 may include, but is not limited to, an indication of the interaction type 162 of the digital data interaction 160, an identity of the source data profile 130 from which a pre-selected amount of data objects were transported, an identity of the target data profile (e.g., target data profile 130d) to which the pre-selected data objects 132 were transported, the exact amount of the pre-selected data objects there were transported from the source data profile 130, and an identity of a user/entity that owns and/or manages the target data profile 130d.

In one or more embodiments, interaction manager 150 may store a rule set 170 that specifies how digital data interactions 160 are to be transported between data profiles 130 of a user 106. In one embodiment, the rule set 170 defines translation (e.g., mapping) between each interaction type 162 of a plurality of interaction types 162 of digital data interactions 160 performed using a default data profile 130 of the user 106 to a particular data profile 130 of the user 106. The rule set 170 may include a plurality of rules 172, wherein each rule 172 defines a translation (e.g., mapping) of a particular interaction type 162 to a particular data profile 130. For example, a first rule 172 from the rule set 170 may include a translation of a first interaction type 162 to the first data profile 130a of the first user 106a. This means that all digital data interactions of the first interaction type 162 performed using the default data profile 130 are to be electronically transported to the first data profile 130a of the first user 106a. In one embodiment, electronically transporting a digital data interaction 160 from the default data profile 130c to the first data profile 130c includes electronic transport of a digital interaction record 134 of the digital data interaction 160 to the first data profile 130a. It may be noted that while embodiments of the present disclosure describes the rule set 170 including rules 172 for electronically transporting digital data interactions 160 from the default data profile 130c of the first user 106a to one of the other data profiles (e.g., first data profile 130a or second data profile 130b) of the first user 106a, the rule set 170 may include rules 172 for transporting digital data interactions 160 between any two data profiles of a user 106.

In one or more embodiments, a default data profile 130c of a user 106 (e.g., first user 106a) is configured to be used for performing all digital data interactions 160 associated with the user 106. For example, when the first user 106a requests that a pre-selected amount of data objects 132 owned by the first user 106a are electronically transported to a target data profile 130c, interaction manager 150 automatically uses the default data profile 130c associated with the first user 106c to complete the requested electronic transport of data objects 132. For example, interaction manager 150 may electronically transport the requested amount of the data objects 132 from the default data profile 130c of the first user 106c to the target data profile 130d. In one embodiment, the first user 106c may explicitly request the interaction manager 150 that the default data profile 130c be used to complete the requested digital data interaction 160. In one embodiment, a user 106 may designate one of the data profiles 130 owned and/or managed by the user 106 as a default data profile 130c. For example, first user 106a may designate a third data profile (not shown) owned and/or managed by the first user 106a as a default data profile 130c.

In one example use case, interaction manager 150 may receive a request 140 from the first user 106a to perform a first digital data interaction 160 including electronically transporting a first amount of data objects 132 owned by the first user 106a to a target data profile 130d. The request may include instructions to use the default data profile 130c of the first user to complete the requested first digital data interaction 160. In response to receiving the request 140, interaction manager 150 may access (e.g., from memory 156 or another computing node 104 where the default data profile 130c is stored) the default data profile 130c and electronically transport the requested first amount of data objects 132 from the default data profile 130c to the target data profile 130d identified in the request 140. After completing the requested electronic transport, interaction manager 150 may generate a digital interaction record 134 of the completed first digital data interaction 160 and store the generated digital interaction record 134 in the default data profile 130c. The digital interaction record 134 of the requested first digital data interaction 160 may include, but is not limited to, an indication of a first interaction type 162 of the first digital data interaction 160, an identity of the default data profile 130c from which the pre-selected amount of data objects were transported, an identity of the target data profile 130d to which the pre-selected data objects 132 were transported, the exact amount of the pre-selected data objects 132 there were transported from the default data profile 130c, and an identity of a user/entity that owns and/or manages the target data profile 130d. In one embodiment, the request 140 includes an information tag 164 that identifies the first interaction type 162 of the first digital data interaction requested by the first user 106c. The interaction manager 150 may be configured to read the information tag 164 and identify the first interaction type 162 associated with the requested first digital data interaction.

Once the first digital data interaction 160 requested by the first user 106a has been completed (e.g., the electronic transport of the requested data objects 132 has been completed) and the digital interaction record 134 of the first digital data interaction 160 has been stored in the default data profile 130c, interaction manager 150 may be configured to search the rule set 170 for a rule 172 that translates (e.g., maps) the first interaction type 162 associated with the first digital data interaction 160 to one of the other data profiles 130 (e.g., first data profile 130a or second data profile 130b) of the first user 106a. For example, interaction manager 150 may generate a query 174 that is configured to search the rule set 170 (e.g., in memory 156 or another database storing the rule set 170) for a rule 172 that translates (e.g., maps) the first interaction type 162 associated with the first digital data interaction 160 to one of the other data profiles 130 (e.g., first data profile 130a or second data profile 130b) of the first user 106a. Interaction manager 150 may be configured to execute the query 174 in the memory to search the rule set 170 for a data profile 130 of the first user 106a that is mapped to the first interaction type 162 associated with the first digital data interaction 160. In one example, as a result of executing the query 174, interaction manager 150 may obtain a first rule 172 that maps the first interaction type 162 to the first data profile 130*a* of the first user 106*a*. In other words, the first rule 172 specifies that any digital data interaction 160 of the first interaction type 162 performed using the default data profile 130*c* of the first user 106*a* is to be electronically transported to the first data profile 130*a* of the first user 106*a*.

Upon identifying the first rule 172 as a result of searching the rule set 170, interaction manager 150 may be configured to electronically transport the first digital data interaction 160 from the default data profile 130*c* to the first data profile 130*a* of the first user 106*a*. This electronic transport may include electronically transporting the digital interaction record 134 of the first digital data interaction 160 from the default data profile 130*c* to the first data profile 130*a*. In one embodiment, electronically transporting the digital interaction record 134 may include electronically deleting the digital interaction record 134 of the first digital data interaction 160 from the default data profile 130*c* and electronically storing a second digital interaction record 134 of the first digital data interaction 160 to the first data profile 130*a*. The second digital interaction record 134 indicates that the first digital data interaction 160 was completed using the first data profile 130 and that the requested amount of data objects 132 where electronically transported to the target data profile 130*d* from the first data profile 130 (not from the default data profile 130*c*). For example, the second digital interaction record 134 includes an identity of the first data profile 130 (instead of the default data profile 130*c*) as the source data profile from where the requested data objects 132 were transported to the target data profile.

Once the first digital data interaction 160 has been transported to the first data profile 130*a*, interaction manager 150 may be configured to assign a score 138*a* to the first digital data interaction 160 based on the first scoring criteria 136*a* associated with the first data profile 130. As described above, the first scoring criteria 136*a* defines that a score 138*a* is assigned to a digital data interaction 160 of a particular interaction type 162 performed using the first data profile 130*a* as a first percentage of an amount of data objects 132 transported from the first data profile 130*a* as part of the digital data interaction 160. Accordingly, interaction manager 150 may determine a score 138*a* for the first digital data interaction 160 as the first percentage of the pre-selected amount of data objects 132 that were transported to the target data profile 130*d* as part of the first digital data interaction. Interaction manager 150 may be configured to store the score 138*a* generated for the first digital data interaction 160 as part of the first data profile 130*a*.

In one or more embodiments, each rule 172 from the rule set 170 is defined based on a rule configuration 168 provided by a user 106 (e.g., first user 106*a*). In one embodiment, the rule configuration 168 provided by the first user 106*a* includes the rule set 170 or a portion thereof defining transport of digital data interactions between data profiles 130 of the user 106. For example, the rule configuration 168 provided by the first user 106*a* may include one or more rules 172 that translate (e.g., map) particular interaction types 162 to respective data profiles 130 of the first user 106*a*. For example, the rule configuration 168 provided by the first user 106*a* may include the first rule 172 that translates (e.g., maps) the first interaction type 162 to the first data profile 130*a* of the first user 106*a*.

In one or more alternative embodiments, the rule configuration 168 provided by a user 106 (e.g., first user 106*a*) may include an instruction to increase (e.g., maximize) the scores 138 assigned to digital data interactions 160 of a particular interaction type 162. Interaction manager 150 may be configured to generate one or more rules 172 based on this instruction provided by the user 106. For example, the rule configuration 168 provided by the first user 106*a* may include an instruction to increase (e.g., maximize) scores 138 assigned to digital data interactions 160 of the first interaction type 162. As described above, scores 138 stored in a data profile 130 may be transformed to data objects 132 based on a pre-configured transformation criterion. This means that a higher score stored in a data profile 130 may yield a higher amount of data objects 132 which can then be used to perform data interactions in relation to acquiring products and services. Thus, increasing (e.g., maximizing) the scores 138 assigned to digital data interactions 160 is generally beneficial to the user 106 as it provides the user 106 a higher level of access to products and services.

Following the example of the previous example where the rule configuration 168 provided by the first user 106*a* includes an instruction to increase scores 138 assigned to digital data interactions 160 of the first interaction type 162, interaction manager 150 may be configured to generate a rule 172 that translates (e.g., maps) the first interaction type 162 to a data profile 130 of the first user 106*a* that is associated with a scoring criteria 136 that results in higher scores 138 being assigned to digital data interactions 160 of the first interaction type 162. In one embodiment, to generate the rule 172 based on the rule configuration 168, interaction manager 150 compares the first scoring criteria 136*a* associated with the first data profile 130*a* to the second scoring criteria 136*b* associated with the second data profile 130*b* and determines a scoring criteria 136*a/b* that is configured to assign higher respective scores 138*a/b* to digital data interactions 160. For example, the first scoring criteria 136*a* may define that a score 138*a* is assigned to a digital data interaction 160 of the first interaction type 162 when performed using the first data profile 130*a* as a first percentage of an amount of data objects 132 transported from the first data profile 130*a* as part of the digital data interaction 160. On the other hand, the second scoring criteria 136*b* may define that a score 138*b* is assigned to a digital data interaction 160 of the same first interaction type 162 when performed using the second data profile 130*b* as a second percentage of an amount of data objects 132 transported from the second data profile 130*b* as part of the digital data interaction 160.

Interaction manager 150 may compare the first percentage associated with the first scoring criteria 136*a* to the second percentage associated with the second scoring criteria 136*b* and determine, based on the comparison, that the first percentage is higher than the second percentage. This means that the first scoring criteria 136*a* is configured to assign a higher score as compared to the second scoring criteria 136*b* for the same digital data interaction 160 of the first interaction type 162 when performed using the first data profile 130*a*. In response to determining that the first percentage associated with the first scoring criteria 136*a* is higher than the second percentage associated with the second scoring criteria 136*b*, interaction manager 150 may generate the first rule 172 that translates the first interaction type 162 to the first data profile 130*a* of the first user 106*a*. Interaction manager 150 may store the first rule 172 as part of the rule set 170.

In one or more embodiments, interaction manager 150 may be configured to evaluate one or more rules 172 in the rule set 170 and update the one or more rules 172 as needed, in response to detecting that scoring criteria 136 associated with a data profile 130 has changed. For example, interaction manager 150 may receive an indication (e.g., an automatic machine generated indication) that the second percentage associated with the second scoring criteria 136b of the second data profile 130b has changed. In response, interaction manager 150 may compare the first percentage associated with the first scoring criteria 136a to the updated second percentage associated with the second scoring criteria 136b and determine, based on the comparison, that the updated second percentage is now higher than the first percentage. In response to determining that the updated second percentage is now higher than the first percentage, interaction manager 150 may update/change the first rule 172 to translate (e.g., map) the first interaction type 162 to the second data profile 130b and stores the updated first rule 172 as part of the rule set 170.

In one embodiment, interaction manager 150 may be configured to explicitly request approval from a user 106 (e.g., first user 106a) to automatically transport digital data interactions 160 between data profiles 130 of the user 106 based on rule set 170. Interaction manager 150 may be configured to perform the automatic transports of digital data interactions 160 only upon receiving approval from the user 106. For example, interaction manager 150 may transmit a request to the first user 106a to accept/approve automatic transport digital data interactions 160 between data profiles 130 of the user 106 based on rule set 170 and receive a message from the first user 106a accepting/approving the automatic transport of the digital data interactions 160.

In one or more embodiments, automatically updating a data profile 130 (e.g., the first data profile 130a) with the interaction record 134 of a requested data interaction 160 in real time or near real time shortly after the requested data interaction 160 using the default data profile 130c is completed provides the technical advantage of the data profile 130 always reflecting the most current interaction records 134 thereby reducing or eliminating data discrepancies that can affect downstream computer elements that rely on the data profile 130 for subsequent processing. For example, a downstream computer system may be configured to generate interaction reports based on interaction records 134 associated with the first data profile 130a. However, when the first data profile 130a does not reflect the most current set of interaction records 134 (e.g., when the first data profile 130a has not been updated with the interaction record 134 of the requested data interaction 160 previously completed using the default profile 130c), a report generated by the downstream system may be erroneous. This may lead to errors in the downstream system including hung states and system downtime associated with detecting and resolving the errors associated with the downstream system. By maintaining a data profile 130 (e.g., first data profile 130a) in its most current state, the disclosed system and methods avoid these performance issues associated with the downstream system.

In one or more additional or alternative embodiments, the interaction manager 150 may be configured to enforce data standards and formats when updating data profiles 130 (e.g., when adding interaction records 134 to the data profile 130), leading to uniform and high-quality data in the data profiles 130. Thus, the computer systems described herein provide distinct advantages over any human operation because they can handle large volumes of data more efficiently than any manual processes, making it possible to scale operations.

Figure 2:
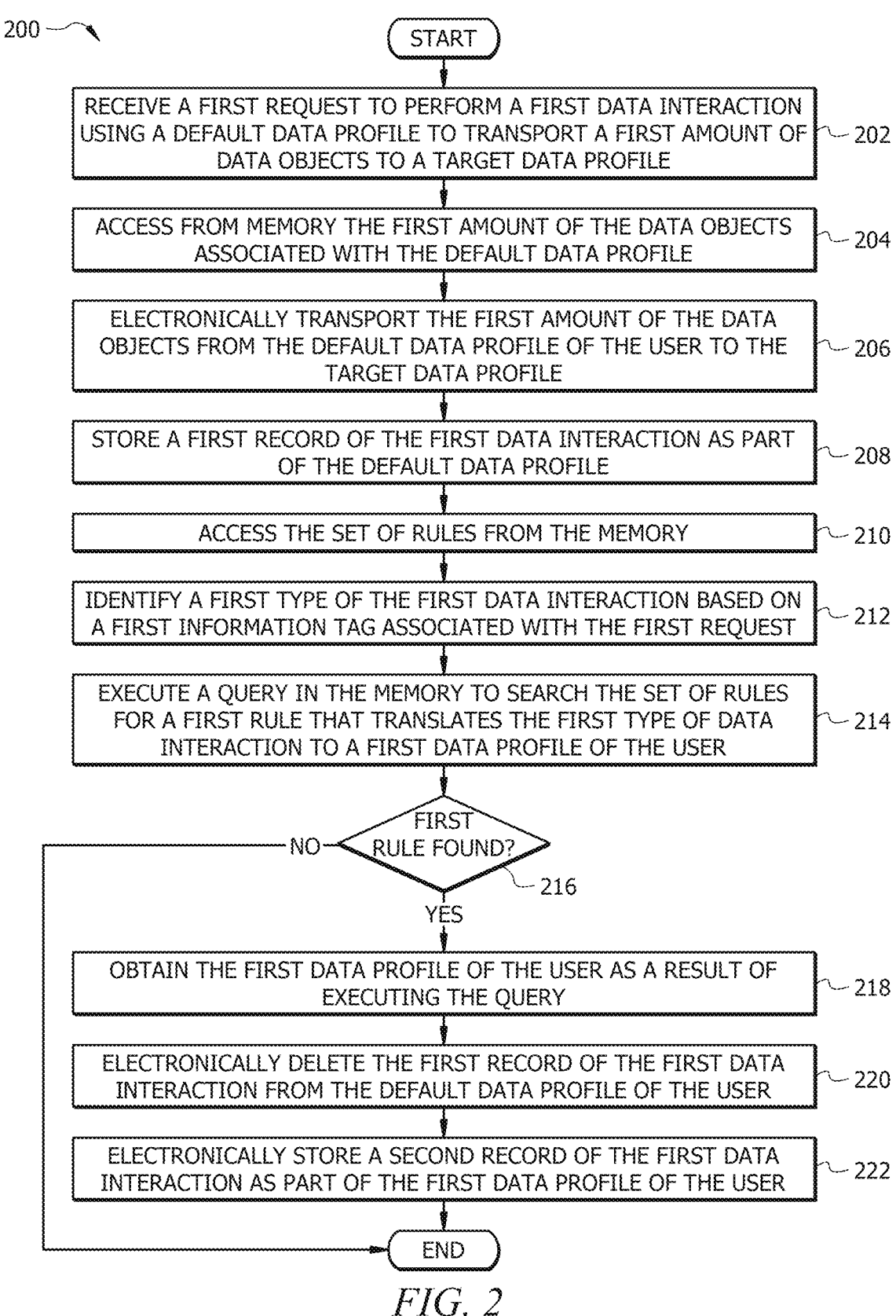
FIG. 2 illustrates a flowchart of an example method for electronically transporting digital data interactions between data profiles of a user, in accordance with certain embodiments of the present disclosure.

FIG. 2 illustrates a flowchart of an example method 200 for electronically transporting digital data interactions 160 between data profiles 130 of a user 106, in accordance with certain embodiments of the present disclosure. Method 200 may be performed by the interaction manager 150 shown in FIG. 1.

At operation 202, interaction manager 150 receives a first request 140 to perform a first digital data interaction 160 using a default data profile 130c of the user 106 (e.g., first user 106a), wherein the first request 140 includes a request to transport a first amount of data objects 132 to a target data profile 130d.

As described above, interaction manager 150 may receive a request 140 from the first user 106a to perform a first digital data interaction 160 including electronically transporting a first amount of data objects 132 owned by the first user 106a to a target data profile 130d. The request may include instructions to use the default data profile 130c of the first user to complete the requested first digital data interaction 160.

At operation 204, in response to receiving the first request 140, interaction manager 150 accesses, from the memory 156, the first amount of data objects 132 associated with the default profile 130c of the user 106 (e.g., first user 106a).

At operation 206, interaction manager 150 electronically transports the first amount of the data objects 132 from the default profile 130c of the user 106 (e.g., first user 106a) to the target data profile 130d.

At operation 208, interaction manager 150 stores a first record (e.g., digital interaction record 134) of the first digital data interaction 160 as part of the default profile 130c of the user (e.g., first user 106a).

As described above, in response to receiving the request 140, interaction manager 150 may access (e.g., from memory 156 or another computing node 104 where the default data profile 130c is stored) the default data profile 130c and electronically transport the requested first amount of data objects 132 from the default data profile 130c to the target data profile 130d identified in the request 140. After completing the requested electronic transport, interaction manager 150 may generate a digital interaction record 134 of the completed first digital data interaction 160 and store the generated digital interaction record 134 in the default data profile 130c. The digital interaction record 134 of the requested first digital data interaction 160 may include, but is not limited to, an indication of a first interaction type 162 of the first digital data interaction 160, an identity of the default data profile 130c from which the pre-selected amount of data objects were transported, an identity of the target data profile 130d to which the pre-selected data objects 132 were transported, the exact amount of the pre-selected data objects 132 there were transported from the default data profile 130c, and an identity of a user/entity that owns and/or manages the target data profile 130d.

At operation 210, after the electronic transport of the first amount of the data objects 132 has been completed, interaction manager 150 accesses the set of rules (e.g., rule set 170) from the memory 156, wherein the set of rules includes translation between each type of a plurality of types of digital data interactions (e.g., interaction types 162) to a particular data profile 130 (e.g., first data profile 130a or second data profile 130b) of the user (e.g., first user 106a).

At operation 212, interaction manager identifies a first type (e.g., interaction type 162) of the first digital data interaction 160 based on a first information tag 164 associated with the first request 140.

As described above, the request 140 includes an information tag 164 that identifies the first interaction type 162 of the first digital data interaction requested by the first user 106c. The interaction manager 150 may be configured to read the information tag 164 and identify the first interaction type 162 associated with the requested first digital data interaction.

At operation 214, interaction manager 150 executes a query 174 in the memory 156 based on the first type (e.g., interaction type 162) of the first digital data interaction 160 to search the set of rules (e.g., rule set 170) for a first rule 172 that translates the first type of digital data interaction 160 (e.g., interaction type 162) to a first data profile 130 (e.g., first data profile 130*a* or second data profile 130*b*) of the user 106 (e.g., first user 106*a*).

As described above, once the first digital data interaction 160 requested by the first user 106*a* has been completed (e.g., the electronic transport of the requested data objects 132 has been completed) and the digital interaction record 134 of the first digital data interaction 160 has been stored in the default data profile 130*c*, interaction manager 150 may be configured to search the rule set 170 for a rule 172 that translates (e.g., maps) the first interaction type 162 associated with the first digital data interaction 160 to one of the other data profiles 130 (e.g., first data profile 130*a* or second data profile 130*b*) of the first user 106*a*. For example, interaction manager 150 may generate a query 174 that is configured to search the rule set 170 (e.g., in memory 156 or another database storing the rule set 170) for a rule 172 that translates (e.g., maps) the first interaction type 162 associated with the first digital data interaction 160 to one of the other data profiles 130 (e.g., first data profile 130*a* or second data profile 130*b*) of the first user 106*a*. Interaction manager 150 may be configured to execute the query 174 in the memory to search the rule set 170 for a data profile 130 of the first user 106*a* that is mapped to the first interaction type 162 associated with the first digital data interaction 160.

At operation 216, if the first rule 172 is not found as a result of executing the query 174, method 200 ends here. On the other hand, if the first rule 172 that translates the first type of digital data interaction 160 (e.g., interaction type 162) to a first data profile 130 of the user 106 (e.g., first user 106*a*) is found, method proceeds to operation 218 where interaction manager 150 obtains the first data profile 130*a* of the user 106 (e.g., first user 106*a*) as a result of executing the query 174.

As described above, as a result of executing the query 174, interaction manager 150 may obtain a first rule 172 that maps the first interaction type 162 to the first data profile 130*a* of the first user 106*a*. In other words, the first rule 172 specifies that any digital data interaction 160 of the first interaction type 162 performed using the default data profile 130*c* of the first user 106*a* is to be electronically transported to the first data profile 130*a* of the first user 106*a*.

At operations 220, interaction manager 150 electronically deletes the first record (e.g., digital interaction record 134) of the first digital data interaction 160 from the default data profile 130*c* of the user 106 (e.g., first user 106*a*).

At operation 222, interaction manager 150 stores a second record (e.g., digital interaction record 134) of the first digital data interaction 160 as part of the first data profile 130*a* of the user 106 (e.g., 106*a*), wherein the second record indicates the first amount of the data objects 132 transported from the first data profile 130*a* of the user 106 (e.g., first user 106*a*) to the target data profile 130*d*.

As described above, upon identifying the first rule 172 as a result of searching the rule set 170, interaction manager 150 may be configured to electronically transport the first digital data interaction 160 from the default data profile 130*c* to the first data profile 130*a* of the first user 106*a*. This electronic transport may include electronically transporting the digital interaction record 134 of the first digital data interaction 160 from the default data profile 130*c* to the first data profile 130*a*. In one embodiment, electronically transporting the digital interaction record 134 may include electronically deleting the digital interaction record 134 of the first digital data interaction 160 from the default data profile 130*c* and electronically storing a second digital interaction record 134 of the first digital data interaction 160 to the first data profile 130*a*. The second digital interaction record 134 indicates that the first digital data interaction 160 was completed using the first data profile 130 and that the requested amount of data objects 132 where electronically transported to the target data profile 130*d* from the first data profile 130 (not from the default data profile 130*c*). For example, the second digital interaction record 134 includes an identity of the first data profile 130 (instead of the default data profile 130*c*) as the source data profile from where the requested data objects 132 were transported to the target data profile.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
 a memory storing a set of rules for transporting data interactions between data profiles of a user; and
 a processor communicatively coupled to the memory and configured to:
  receive a first request to perform a first data interaction using a default data profile of the user, wherein the first request comprises a request to transport a first amount of data objects to a target data profile;
  in response to receiving the first request:
   access, from the memory, the first amount of the data objects associated with the default data profile of the user;
   electronically transport the first amount of the data objects from the default data profile of the user to the target data profile, wherein the electronic transport comprises a first electronic transport; and store a first record of the first data interaction as part of the default data profile of the user;

after the first electronic transport is completed:

access the set of rules from the memory, wherein the set of rules comprises a translation between each type of a plurality of types of data interactions to a particular data profile of the user;

identify a first type of the first data interaction based on a first information tag associated with the first request;

execute a query in the memory based on the first type of the first data interaction to search the set of rules for a first rule that translates the first type of data interaction to a first data profile of the user;

obtain the first data profile of the user as a result of executing the query;

electronically delete the first record of the first data interaction from the default data profile of the user; and electronically store a second record of the first data interaction as part of the first data profile of the user, wherein the second record indicates the first amount of the data objects transported from the first data profile of the user to the target data profile.

2. The system of claim 1, wherein the processor is further configured to:

receive a rule configuration from the user, the rule configuration comprising the set of rules defining the transport of the data interactions between the data profiles of the user.

3. The system of claim 1, wherein:

the memory stores:

a first scoring criterion associated with the first user data profile of the user, wherein the first scoring criterion is used to assign a first score to the first type of data interactions as a first percentage of the data objects transported as part of the respective data interactions; and a second scoring criterion associated with a second user data profile of the user, wherein the second scoring criterion is used to assign a second score to the first type of data interactions as a second percentage of the data objects transported as part of the respective data interactions.

4. The system of claim 3, wherein the processor is further configured to:

receive a rule configuration from the user comprising a request to increase scores assigned to the first type of data interactions requested by the user;

in response to receiving the rule configuration, compare the first percentage associated with the first scoring criterion to the second percentage associated with the second scoring criterion;

determine, based on the comparing, that the first percentage is higher than the second percentage;

in response to determining that the first percentage is higher than the second percentage, generate the first rule translating the first type of data interaction to the first data profile of the user;

store the first rule in the memory as part of the set of rules.

5. The system of claim 4, wherein the processor is further configured to:

after storing the second record of the first data interaction as part of the first data profile of the user, determine the first score for the first data interaction based on the first scoring criterion as the first percentage of the first amount of data objects; and store the first score as part of the first data profile of the user.

6. The system of claim 4, wherein the processor is further configured to:

receive an indication that the second percentage associated with the second scoring criterion has changed;

in response to the indication, compare the first percentage associated with the first scoring criterion to the second percentage associated with the second scoring criterion;

determine, based on the comparing, that the second percentage is higher than the first percentage;

in response to determining that the second percentage is higher than the first percentage, update the first rule translating the first type of data interaction to the second data profile of the user;

store an updated first rule in the memory as part of the set of rules.

7. The system of claim 1, wherein the processor is further configured to:

transmit a second request to accept automatic transport of data interactions between the data profiles of the user based on the set of rules; and receive a message from the user accepting the automatic transport of the data interactions between the data profiles of the user based on the set of rules.

8. A method comprising:

receiving a first request to perform a first data interaction using a default data profile of a user, wherein the first request comprises a request to transport a first amount of data objects to a target data profile;

in response to receiving the first request:

accessing, from a memory, the first amount of the data objects associated with the default data profile of the user;

electronically transporting the first amount of the data objects from the default data profile of the user to the target data profile, wherein the electronic transport comprises a first electronic transport; and storing a first record of the first data interaction as part of the default data profile of the user;

after the first electronic transport is completed:

accessing a set of rules from the memory, wherein the set of rules comprises a translation between each type of a plurality of types of data interactions to a particular data profile of the user;

identifying a first type of the first data interaction based on a first information tag associated with the first request;

executing a query in the memory based on the first type of the first data interaction to search the set of rules for a first rule that translates the first type of data interaction to a first data profile of the user;

obtaining the first data profile of the user as a result of executing the query;

electronically deleting the first record of the first data interaction from the default data profile of the user; and electronically storing a second record of the first data interaction as part of the first data profile of the user, wherein the second record indicates the first amount of the data objects transported from the first data profile of the user to the target data profile.

9. The method of claim 8, further comprising:
receiving a rule configuration from the user, the rule configuration comprising the set of rules defining the transport of the data interactions between the data profiles of the user.

10. The method of claim 8, wherein:
the memory stores:
  a first scoring criterion associated with the first user data profile of the user, wherein the first scoring criterion is used to assign a first score to the first type of data interactions as a first percentage of the data objects transported as part of the respective data interactions; and
  a second scoring criterion associated with a second user data profile of the user, wherein the second scoring criterion is used to assign a second score to the first type of data interactions as a second percentage of the data objects transported as part of the respective data interactions.

11. The method of claim 10, further comprising:
receiving a rule configuration from the user comprising a request to increase scores assigned to the first type of data interactions requested by the user;
in response to receiving the rule configuration, comparing the first percentage associated with the first scoring criterion to the second percentage associated with the second scoring criterion;
determining, based on the comparing, that the first percentage is higher than the second percentage;
in response to determining that the first percentage is higher than the second percentage, generating the first rule translating the first type of data interaction to the first data profile of the user;
storing the first rule in the memory as part of the set of rules.

12. The method of claim 11, further comprising:
after storing the second record of the first data interaction as part of the first data profile of the user, determining the first score for the first data interaction based on the first scoring criterion as the first percentage of the first amount of data objects; and
storing the first score as part of the first data profile of the user.

13. The method of claim 11, further comprising:
receiving an indication that the second percentage associated with the second scoring criterion has changed;
in response to the indication, comparing the first percentage associated with the first scoring criterion to the second percentage associated with the second scoring criterion;
determining, based on the comparing, that the second percentage is higher than the first percentage;
in response to determining that the second percentage is higher than the first percentage, updating the first rule translating the first type of data interaction to the second data profile of the user;
storing an updated first rule in the memory as part of the set of rules.

14. The method of claim 8, further comprising:
transmitting a second request to accept automatic transport of data interactions between the data profiles of the user based on the set of rules; and
receiving a message from the user accepting the automatic transport of the data interactions between the data profiles of the user based on the set of rules.

15. A non-transitory computer-readable medium storing instructions that when executed by a processor cause the processor to:
receive a first request to perform a first data interaction using a default data profile of a user, wherein the first request comprises a request to transport a first amount of data objects to a target data profile;
in response to receiving the first request:
  access, from a memory, the first amount of the data objects associated with the default data profile of the user;
  electronically transport the first amount of the data objects from the default data profile of the user to the target data profile, wherein the electronic transport comprises a first electronic transport; and
  store a first record of the first data interaction as part of the default data profile of the user;
after the first electronic transport is completed:
  access a set of rules from the memory, wherein the set of rules comprises a translation between each type of a plurality of types of data interactions to a particular data profile of the user;
  identify a first type of the first data interaction based on a first information tag associated with the first request;
  execute a query in the memory based on the first type of the first data interaction to search the set of rules for a first rule that translates the first type of data interaction to a first data profile of the user;
  obtain the first data profile of the user as a result of executing the query;
  electronically delete the first record of the first data interaction from the default data profile of the user; and
  electronically store a second record of the first data interaction as part of the first data profile of the user, wherein the second record indicates the first amount of the data objects transported from the first data profile of the user to the target data profile.

16. The non-transitory computer-readable medium of claim 15, wherein the instructions further cause the processor to:
receive a rule configuration from the user, the rule configuration comprising the set of rules defining the transport of the data interactions between the data profiles of the user.

17. The non-transitory computer-readable medium of claim 15, wherein:
the memory stores:
  a first scoring criterion associated with the first user data profile of the user, wherein the first scoring criterion is used to assign a first score to the first type of data interactions as a first percentage of the data objects transported as part of the respective data interactions; and
  a second scoring criterion associated with a second user data profile of the user, wherein the second scoring criterion is used to assign a second score to the first type of data interactions as a second percentage of the data objects transported as part of the respective data interactions.

18. The non-transitory computer-readable medium of claim 17, wherein the instructions further cause the processor to:

receive a rule configuration from the user comprising a request to increase scores assigned to the first type of data interactions requested by the user;

in response to receiving the rule configuration, compare the first percentage associated with the first scoring criterion to the second percentage associated with the second scoring criterion;

determine, based on the comparing, that the first percentage is higher than the second percentage;

in response to determining that the first percentage is higher than the second percentage, generate the first rule translating the first type of data interaction to the first data profile of the user;

store the first rule in the memory as part of the set of rules.

19. The non-transitory computer-readable medium of claim 18, wherein the instructions further cause the processor to:

after storing the second record of the first data interaction as part of the first data profile of the user, determine the first score for the first data interaction based on the first scoring criterion as the first percentage of the first amount of data objects; and store the first score as part of the first data profile of the user.

20. The non-transitory computer-readable medium of claim 18, wherein the instructions further cause the processor to:

receive an indication that the second percentage associated with the second scoring criterion has changed;

in response to the indication, compare the first percentage associated with the first scoring criterion to the second percentage associated with the second scoring criterion;

determine, based on the comparing, that the second percentage is higher than the first percentage;

in response to determining that the second percentage is higher than the first percentage, update the first rule translating the first type of data interaction to the second data profile of the user;

store an updated first rule in the memory as part of the set of rules.

* * * * *